(12) United States Patent
Yan

(10) Patent No.: US 6,933,003 B2
(45) Date of Patent: Aug. 23, 2005

(54) METHOD OF MAKING MEMBRANE ELECTRODE ASSEMBLIES

(75) Inventor: Susan G. Yan, Fairport, NY (US)

(73) Assignee: General Motors Corporation, Detroit, MI (US)

( * ) Notice: Subject to any disclaimer, the term of this patent is extended or adjusted under 35 U.S.C. 154(b) by 127 days.

(21) Appl. No.: 10/171,295

(22) Filed: Jun. 13, 2002

(65) Prior Publication Data

US 2003/0232714 A1 Dec. 18, 2003

(51) Int. Cl.[7] .............................. H01M 4/88; B01D 5/12
(52) U.S. Cl. ...................... 427/115; 502/101; 29/623.5
(58) Field of Search ....................... 427/115; 502/101; 429/41, 42, 44, 45; 29/623.5

(56) References Cited

U.S. PATENT DOCUMENTS

| | | | |
|---|---|---|---|
| 3,953,566 A | | 4/1976 | Gore |
| 4,350,608 A | | 9/1982 | Gestaut |
| 4,465,533 A | | 8/1984 | Covitch |
| 4,469,579 A | | 9/1984 | Covitch et al. |
| 4,876,115 A | | 10/1989 | Raistrick |
| 5,116,800 A | | 5/1992 | Williamson et al. |
| 5,211,984 A | | 5/1993 | Wilson |
| 5,230,849 A | * | 7/1993 | Hsu ............................ 264/104 |
| 5,234,777 A | | 8/1993 | Wilson |
| 5,272,017 A | | 12/1993 | Swathirajan et al. |
| 5,316,871 A | * | 5/1994 | Swathirajan et al. ........... 429/33 |
| 5,330,860 A | * | 7/1994 | Grot et al. ..................... 429/42 |
| 5,409,588 A | | 4/1995 | Mushiake et al. |
| 5,470,448 A | * | 11/1995 | Molter et al. ................ 204/252 |
| 5,518,831 A | * | 5/1996 | Tou et al. ....................... 429/42 |
| 5,547,551 A | | 8/1996 | Bahar et al. |
| 5,599,614 A | | 2/1997 | Bahar et al. |
| 5,635,041 A | | 6/1997 | Bahar et al. |
| 5,707,755 A | | 1/1998 | Grot |
| 5,723,173 A | | 3/1998 | Fukuoka et al. |

(Continued)

FOREIGN PATENT DOCUMENTS

| | | | | |
|---|---|---|---|---|
| JP | 06011612 A | * | 1/1994 | ............ G02B/5/20 |
| JP | 06-013085 | | 1/1994 | |
| WO | WO 99/34466 | | 7/1999 | |

OTHER PUBLICATIONS

Wilson, M.S. et al., "Thin–film catasyst layers for polymer electrolyte fuel cell electrodes", Journal of Applied Electrochemistry 22 (1992), pp. 1–7.*

Proceedings of the First International Symposium on Proton Conducting Membrane Fuel Cells, Kolde et al., "Advanced Composite Polymer Electrolyte Fuel Cell Membranes," Electrochemical Society Proceedings, vol. 95–23, pp 192–201.

Advances in Electrochemical Science and Engineering, vol. 5, Gottesfeld et al., "Polymer Electrolyte Fuel Cells," WILEY–VCH.

Notification of Transmittal Of The International Search Report Or The Declaration, dated Aug. 26, 2003.

Primary Examiner—Gregg Cantelmo
(74) Attorney, Agent, or Firm—Harness, Dickey & Pierce, P.L.C.

(57) ABSTRACT

A method of making a membrane electrode assembly is provided. The method includes providing a non-porous substrate which has sufficient structural integrity to be reusable or which is formed into a loop. A slurry is formed which includes an ionically conductive material, an electrically conductive material, a catalyst, and a solvent. The slurry is applied onto the non-porous substrate, for example, in a pattern of discrete areas. The slurry is dried to form decals. The decals are bonded to a membrane and then the substrate is peeled from the decal in a substantially undamaged condition so that it may be reused.

18 Claims, 4 Drawing Sheets

U.S. PATENT DOCUMENTS

| | | | | |
|---|---|---|---|---|
| 5,738,905 A | * | 4/1998 | Bevers | 427/115 |
| 5,858,264 A | | 1/1999 | Ichino et al. | |
| 5,937,512 A | * | 8/1999 | Lake et al. | 29/832 |
| 5,981,097 A | | 11/1999 | Rajendran | |
| 6,054,230 A | | 4/2000 | Kato | |
| 6,074,692 A | | 6/2000 | Hulett | |
| 6,127,059 A | | 10/2000 | Kato | |
| 6,127,061 A | | 10/2000 | Shun et al. | |
| 6,180,163 B1 | | 1/2001 | Artysiewicz et al. | |
| 6,197,147 B1 | * | 3/2001 | Bonsel et al. | 156/269 |
| 6,391,486 B1 | | 5/2002 | Narayanan et al. | |
| 6,641,862 B1 | * | 11/2003 | Grot | 427/115 |

* cited by examiner

METHOD OF MAKING MEMBRANE ELECTRODE ASSEMBLIES

FIELD OF THE INVENTION

The present invention relates to PEM/SPE fuel cells, and more particularly to a method of making electrodes and membrane electrode assemblies.

BACKGROUND OF THE INVENTION

Electrochemical cells are desirable for various applications, particularly when operated as fuel cells. Fuel cells have been proposed for many applications including electrical vehicular power plants to replace internal combustion engines. One fuel cell design uses a solid polymer electrolyte (SPE) membrane or proton exchange membrane (PEM), to provide ion exchange between the anode and cathode. Gaseous and liquid fuels are useable within fuel cells. Examples include hydrogen and methanol, with hydrogen being favored. Hydrogen is supplied to the fuel cell's anode. Oxygen (as air) is the cell oxidant and is supplied to the cell's cathode. The electrodes are formed of porous conductive materials, such as woven graphite, graphitized sheets, or carbon paper to enable the fuel to disperse over the surface of the membrane facing the fuel supply electrode. A typical fuel cell is described in U.S. Pat. No. 5,272,017 and U.S. Pat. No. 5,316,871 (Swathirajan et al.).

Important aspects of a fuel cell include reaction surfaces where electrochemical reactions take place, catalysts which catalyze such reactions, ion conductive media, and mass transport media. The cost of power produced by a fuel cell is, in part, dependent on the cost of preparing electrodes and membrane electrode assemblies (MEA). The cost of power produced by a fuel cell is greater than competitive power generation alternatives, partly because of the cost of preparing such electrodes and MEAs. However, power produced from hydrogen-based fuel cells is desirable because hydrogen is environmentally acceptable and hydrogen fuel cells are efficient.

Therefore, it is desirable to improve the manufacture of such assemblies and to improve the cost and render fuel cells more attractive for transportation use.

SUMMARY OF THE INVENTION

According to one aspect of the present invention a method useful for making a membrane electrode assembly is provided. The method according to this aspect includes providing a non-porous substrate which has sufficient structural integrity to be reusable. A slurry is formed which includes an ionically conductive material, an electrically conductive material, a catalyst, and a solvent. The slurry is applied onto the non-porous substrate and dried to form a decal. The decal is bonded to a membrane and then the substrate is peeled from the decal in a substantially undamaged condition so that it may be reused.

According to another aspect of the present invention a method of making membrane electrode assemblies is provided. The method according to this aspect includes providing a loop of a non-porous substrate. A slurry is again formed comprising an ionically conductive material, an electrically conductive material, a catalyst, and a solvent. The slurry is applied to the substrate in a pattern of discrete areas. The slurry is dried to form a plurality of decals corresponding to the discrete areas on the substrate. The decals are bonded to opposite sides of a plurality of membranes to form a plurality of membrane electrode assemblies. The membrane electrode assemblies are peeled from the loop of non-porous substrate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF PREFERRED EMBODIMENTS

The following description of the preferred embodiments is merely exemplary in nature and is in no way intended to limit the invention, its application, or uses. For example, although the invention is described herein with reference to a fuel cell, it is applicable to electrochemical cells generally.

Figure 1:
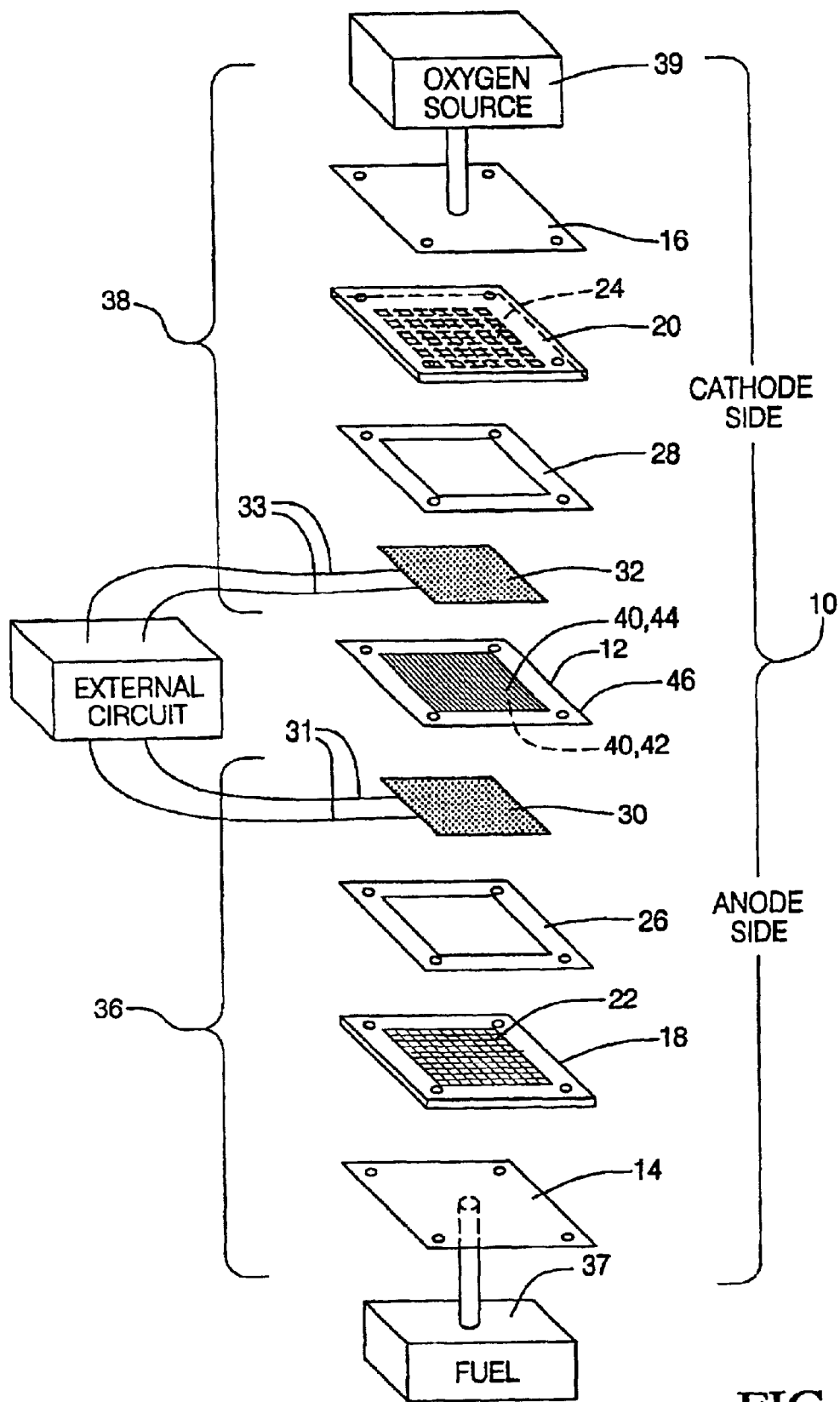
FIG. 1 is a schematic view of an unassembled electrochemical fuel cell having a membrane electrode assembly prepared according to a preferred embodiment of the invention.

The invention is directed to forming electrodes and membrane electrode assemblies for use in fuel cells. Before describing the invention in detail, it is useful to understand the basic elements of a fuel cell and the components of the membrane electrode assembly. Referring to FIG. 1, an electrochemical cell 10 with a membrane electrode assembly 12 incorporated therein is shown in pictorial unassembled form. The illustrated electrochemical cell 10 is constructed as a fuel cell. Electrochemical cell 10 comprises stainless steel endplates 14, 16, graphite blocks 18, 20 with openings 22, 24 to facilitate gas distribution, gaskets 26, 28, carbon cloth current collectors 30, 32 with respective connections 31, 33 and the membrane electrode assembly 12 and including electrolyte. The two sets of graphite blocks, gaskets, and current collectors, namely 18, 26, 30 and 20, 28, 32 are each referred to as respective gas and current transport means 36, 38. Anode connection 31 and cathode connection 33 are used to interconnect with an external circuit which may include other fuel cells.

Electrochemical fuel cell 10 includes gaseous reactants, one of which is a fuel supplied from fuel source 37, and another is an oxidizer supplied from source 39. The gases from sources 37, 39 diffuse through respective gas and current transport means 36 and 38 to opposite sides of the MEA 12. Respectively, 36 and 38 are also referred to as electrically conductive gas distribution media.

Figure 2:
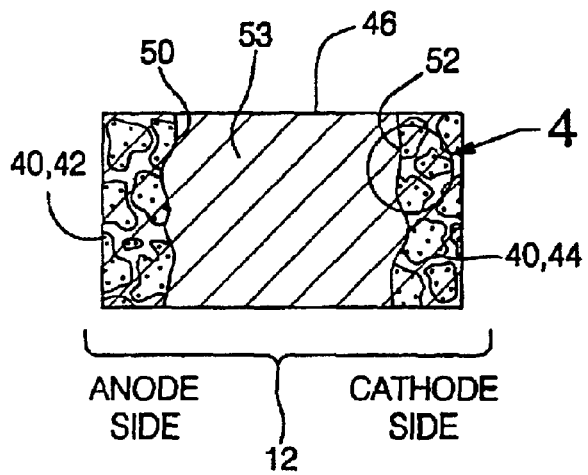
FIG. 2 is a pictorial illustration of a cross-section of a membrane electrode assembly of FIG. 1.

Referring to FIG. 2, a membrane electrode assembly 12 prepared according to a preferred embodiment of the present invention includes porous electrodes 40 which form anode 42 at the fuel side and cathode 44 at the oxygen side. Anode 42 is separated from cathode 44 by a solid polymer electrolytic (SPE) membrane 46. SPE membrane 46 provides for ion transport to facilitate reactions in the fuel cell 10. The electrodes 42, 44 provide proton transfer by intimate contact between the electrode 42, 44 and the ionomer membrane 46 to provide essentially continuous polymeric contact for such proton transfer. Accordingly, the membrane electrode assembly 12 of cell 10 has membrane 46 with spaced apart first and second opposed surfaces 50, 52, and a thickness or an intermediate membrane region 53 between surfaces 50, 52. Respective electrodes 40, namely anode 42 and cathode 44 are well adhered to membrane 46, at a corresponding one of the surfaces 50, 52.

Figure 3:
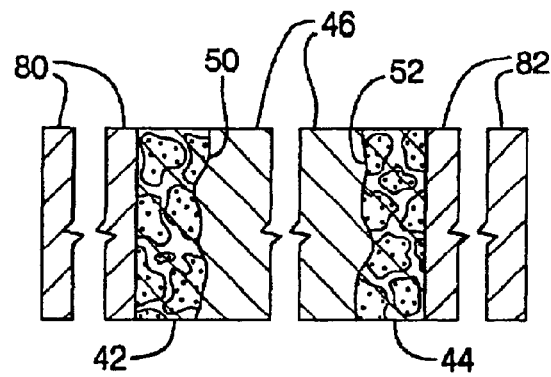
FIG. 3 is a pictorial illustration similar to FIG. 2 of another preferred membrane electrode assembly having graphite sheets.

Referring to FIG. 3, another preferred MEA made according to the process of the present invention includes respective electrodes 40 (anode 42, cathode 44) which further comprise respective first and second Teflonated (polytetrafluoroethylene coated, impregnated) graphite sheets 80, 82, at respective sides of membrane 46. (FIG. 3) The anode active material is disposed between the first surface 50 of the membrane and the first sheet 80; the cathode active material is disposed between the second surface 52 and the second sheet 82. Each Teflonated sheet 80, 82 is about 7.5 to 13 mils thick.

The solid polymer electrolyte (SPE) membrane 46, of the present invention is well known in the art as an ion conductive material. Typical SPE membranes are described in U.S. Pat. Nos. 4,272,353 and 3,134,697, and in Journal of Power Sources, Volume 29 (1990), pages 367–387.

The SPE membranes, or sheets, are ion exchange resin membranes. The resins include ionic groups in their polymeric structure; one ionic component of which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cation exchange, proton conductive resins is the so-called sulfonic acid cation exchange resin. In the sulfonic acid membranes, the cation ion exchange groups are hydrated sulfonic acid radicals which are attached to the polymer backbone by sulfonation.

The formation of these ion exchange resins into membranes or sheets is also well known in the art. The preferred type is perfluorinated sulfonic acid polymer electrolyte in which the entire membrane structure has ion exchange characteristics. These membranes are commercially available, and a typical example of a commercial sulfonated perfluorocarbon, proton conductive membrane is sold by E.I. DuPont de Nemours & Co. under the trade designation Nafion. Others are sold by Asahi Glass and Asahi Chemical Company. Such proton conductive membranes may be characterized for example by monomers of the structures:

$CF_2=CFOCF_2CF_2SO_3H$ and

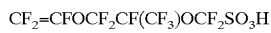
$CF_2=CFOCF_2CF(CF_3)OCF_2SO_3H$

In the electrochemical fuel cell 10 of the invention, the membrane 46 is a cation permeable, proton conductive membrane, having $H^+$ ions as the mobile ion; the fuel gas is hydrogen and the oxidant is oxygen or air. The overall cell reaction is the oxidation of hydrogen to water and the respective reactions at the anode 42 and cathode 44 are as follows:

$H_2 = 2H^+ + 2e$

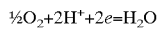
$½O_2 + 2H^+ + 2e = H_2O$

Since hydrogen is used as the fuel gas, the product of the overall cell reaction is water. Typically, the product water is rejected at the cathode 44 which is the electrode 40 on the oxygen side. Typically, water then escapes by simple flow or by evaporation. However, means may be provided if desired, for collecting the water as it is formed and carrying it away from the cell 10.

Good water management in the cell 10 enables successful long-term operation of electrochemical fuel cell 10. Spatial variations of water content within the polymeric electrolyte membrane 46 of a current-carrying fuel cell 10 result from the electro-osmotic dragging of water with proton ($H^+$) transport from anode 42 to cathode 44, the production of water by the oxygen reduction reaction at the cathode 44, humidification conditions of the inlet gas stream, and "back-diffusion" of water from cathode 44 to anode 42. Water management techniques and cell 10 designs related thereto are described in U.S. Pat. Nos. 5,272,017 ('017) and 5,316,871 ('871), each incorporated herein by reference in its entirety. Although water management is an important aspect for fuel cell 10 operation, what is equally important is achieving good distribution and movement through the electrodes 40 of the fuel and oxidant. To achieve this goal it is important to have an electrode 40 with a relatively homogeneous porous structure and which has good structural integrity.

Catalyst decals are formed from a dried layer(s) of a catalyst slurry as described hereinafter. The catalyst decal comprises carbon, and catalyst distribution and loadings according to the requirements of the hydrogen oxidation and oxygen reduction reactions occurring in the fuel cell 10. In addition, effective proton transfer is provided by embedding electrodes 40 into the membrane 46. Accordingly, the membrane electrode assembly 12 of cell 10 has membrane 46 with spaced apart first and second opposed surfaces 50, 52, a thickness or an intermediate membrane region 53 between surfaces 50, 52. Respective electrodes 40, namely anode 42 and cathode 44, are well adhered to membrane 46 at a corresponding one of the surfaces 50, 52. The good porosity and structural integrity of electrodes 40 facilitates formation of the membrane electrode assembly 12.

Figure 4:
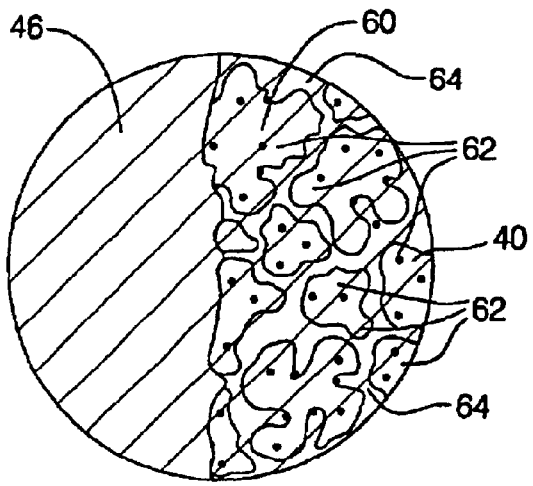
FIG. 4 is a pictorial illustration showing a magnified view of a portion of the cathode side of the membrane electrode assembly of FIG. 2.

As shown in FIG. 4, each of the electrodes 40 are formed of a corresponding group of finely divided carbon particles 60 supporting very finely divided catalytic particles 62 and a proton conductive material 64 intermingled with the particles. It should be noted that the carbon particles 60 forming the anode 42 may differ from the carbon particles 60 forming the cathode 44. In addition, the catalyst loading at the anode 42 may differ from the catalyst loading at the cathode 44. Although the characteristics of the carbon particles and the catalyst loading may differ for anode 42 and cathode 44, the basic structure of the two electrodes 40 is otherwise generally similar, as shown in the enlarged portion of FIG. 4 taken from FIG. 2.

In order to provide a continuous path to conduct $H^+$ ions to the catalyst 62 for reaction, the proton (cation) conductive material 64 is dispersed throughout each of the electrodes 40, is intermingled with the carbon and catalytic particles 60, 62 and is disposed in a plurality of the pores defined by the catalytic particles. Accordingly, in FIG. 4, it can be seen that the proton conductive material 64 encompasses carbon and catalytic particles 60, 62.

The carbon particles define pores some of which are internal pores in the form of holes in the carbon particles 60, 62; other pores are gaps between adjacent carbon particles. Internal pores are also referred to as micropores which generally have an equivalent radius (size) less than about 2 nanometers (nm) or 20 angstroms. External pores are also referred to as mesopores which generally have an equivalent radius (size) of over about 2 nanometers and up to about 20 nanometers or 200 angstroms. The total surface area present in a mass of carbon particles is referred to as BET surface area, expressed in $m^2/gm$. BET surface area accounts for both mesopores and micropores present in the mass. As used herein, the terms "pore" and "pores" refers to both mesopores and micropores and also refers to both internal and external pores unless otherwise indicated.

Membrane electrode assembly 12 has efficient gas movement and distribution to maximize contact between the reactants, i.e., fuel and oxidant, and the catalyst. This region is a porous catalyzed layer which forms the electrodes 40, 70 and comprises particles of catalysts 62, particles of electrically conductive material 60, and particles of ionically conductive material 64. The dried porous catalyzed layer is a decal, once the casting solvent has been removed, which becomes the electrode 40. The three criteria which characterize a good electrode 40 are gas access to the catalyst layer, electrical continuity, and proton access to the ionomer. A typical ionomer is a perfluorinated sulfonic acid polymer, and a typical ionomer used in making the membrane electrode assembly 12 is Nafion.

Figure 5:
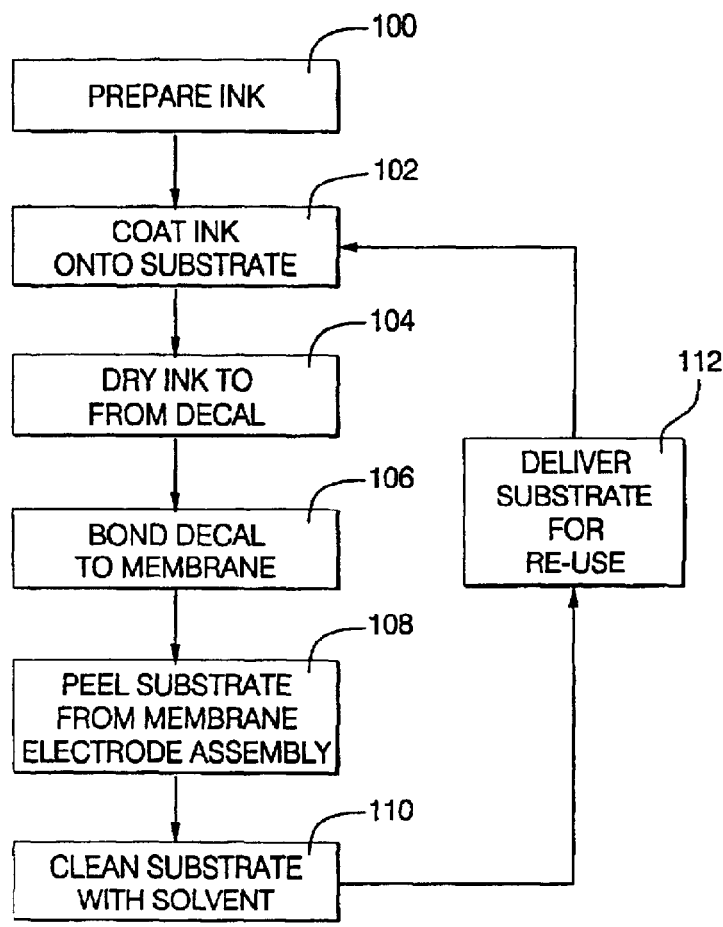
FIG. 5 is a flow chart illustrating a preferred process according to the present invention

Referring to the flow chart of FIG. 5, a preferred process of the present invention includes preparation of the catalyst slurry as indicated at 100. The catalyst slurry is often referred to as an ink and the terms are used interchangeably herein. The term mixture, as used herein, refers to a combination of substances that have been intermingled and is intended to cover either a mixture, a slurry, or a solution. The term slurry refers to a mixture where there is some suspended and undissolved material within a continuous fluid phase, usually a liquid phase, and the liquid in the liquid phase generally being a solvent. The term solution refers to a mixture where there is a solute dissolved in a solvent, thereby forming a single phase containing two or more different substances. The catalyst slurry is initially prepared as a solution of a proton conducting polymer, herein referred to as an ionomer (e.g. Nafion), with particles of electrically conductive material, typically carbon, and particles of catalyst.

The electrically conductive material, e.g., carbon, is typically the catalyst support of the slurry and the catalyst is typically a metal. Thus, the catalyst layer dispersion consists of a mixture of the precious metal catalyst supported on high surface carbon, such as Vulcan XC-72, and an ionomer solution such as Nafion (DuPont Fluoroproducts, NC) in a solvent. Preferred catalysts include metals such as platinum (Pt), palladium (Pd); and mixtures of metals Pt and molybdenum (Mo), Pt and cobalt (Co), Pt and ruthenium (Ru), Pt and nickel (Ni), and Pt and tin (Sn). The ionomer is typically purchased in a solvent of choice and at the desired initial concentration, and additional solvent is added to adjust the ionomer concentration to a desired concentration in the slurry. The slurry optionally contains polytetrafluoroethylene. The catalyst and catalyst support are dispersed in the slurry by techniques such as ultrasonication or ball-milling. The average agglomerate size in a typical slurry is in the range from 50 to 500 nm. Slight variation in performance is associated with slurries made by different dispersing techniques, due to the disparity in the range of particle sizes produced.

The formation of the catalyst slurry involves, on the order of 1 gram of 5 to 80 wt. % catalytically active material on carbon, for example Pt on carbon, and on the order of 8 grams of 1 to 30 wt. % ionomer solution with a solvent. The catalyst loading, wt. % on carbon, is chosen according to the needs and requirements of a specific application. The weight ratio of ionomer to carbon is preferably in the range of 0.20:1 to 2.0:1, with a more preferred range of 0.25:1 to 1:1.

In the slurry, the ratio of solids to liquids is preferably in the range 0.15:1 to 0.35:1, that is, 13% to 27% by weight solids in the slurry. A more preferred range is 0.2:1 to 0.3:1 or 16% to 23% by weight of solids in the slurry. For the specifications given, the solvent makes up about 80% of the slurry weight, and catalyst, ionomer, and carbon makes up the remaining 20%. Available solvents include alcohols, for example iso and normal propanol, ethanol, methanol, water, or a mixture of water and alcohols. It is highly preferred that the solvents be evaporable at room temperature.

The process next involves coating the catalyst slurry onto a substrate which has sufficient structural integrity to be reusable as indicated at 102. The substrate is preferably a non-porous metallic sheet material. The non-porous substrate may be made of any appropriate material. The non-porous metallic substrate is preferably made from a metal chosen from the group consisting of aluminum, copper, gold, nickel, platinum, silver, stainless steel, titanium, and tin; and more preferably, aluminum, nickel, stainless steel, titanium, and tin; and even more preferably, the substrate is made from aluminum.

The non-porous metallic substrate is preferably thick enough that it is not damaged in the process (e.g., when subjected to the temperatures, pressures and processing steps as disclosed herein). Some previous substrates, for example, are known to deformably stretch during the decal peeling step, in contrast to the non-porous metallic substrate of the present invention. Preferably, the non-porous metallic substrate is not subject to wrinkling as a result of the membrane electrode assembly formation process. Conversely, the non-porous metallic substrate is not so thick that it is not possible to peel the substrate from the membrane electrode assembly after its formation. The non-porous metallic substrate is preferably a sheet of material with a thickness that is at least about 1 mil (0.03 millimeter) and more preferably, at least about 2.5 mils (0.06 millimeters). The substrate preferably has a thickness that is less than about 5 mils (0.13 millimeters); and more preferably, less than about 3.5 mils (0.09 millimeters).

A portion of the structural integrity of the metallic substrate may be provided by laminating a relatively thin metallic sheet material or foil to another sheet material. Even in such cases, the metallic sheet material has sufficient structural integrity so that it is not damaged during the membrane electrode assembly formation process and so that the laminate can be reused. For example, the metallic sheet material of such a laminate substrate preferably does not develop fractures or lose material as a result of the membrane electrode assembly formation process.

The non-porous substrate is also preferably metallic which further facilitates the reusability of the substrate. In addition, due to its non-porous nature, the components of the slurry cannot seep down into pores of the substrate. Since no components need to be removed from substrate pores between uses, the substrate is readily reusable. For example, the substrate surface can simply be wiped clean using a solvent between uses. The solvent(s) preferably used to clean the substrate between uses are identical to the solvents discussed above.

Due to the structural integrity of the non-porous metallic substrate, the edges (e.g., the corners) of the substrate can be sufficiently rigid as to damage the SPE membrane if they are allowed to contact it inappropriately. The inappropriate contact results in damage to the membrane electrode assembly, such as by puncturing the SPE. Thus, it is also preferred that the dimensions of the substrate be such that the edges are maintained away from the SPE membrane during processing. Similarly, it is preferred that the non-porous metallic substrate be handled such that it not be allowed to inappropriately contact the SPE membrane during processing.

The prepared catalyst slurry is coated onto the non-porous metallic substrate 72 as indicated at 102. For example, the catalyst slurry is spread onto the metallic substrate in one or more layers and dried at 104 to form a decal with a preselected concentration of catalyst. The catalyst slurry is applied to the substrate by any coating technique, for example, by printing processes or spray coating processes. Preferred processes are screen-printing or Mayer-rod coating. Mayer rod coating, also known as coating with a metering rod, is well known in the art of screen printing or coating processes. Coatings with thicknesses ranging from 3 to 25 $\mu$m or higher are easily obtained and dried on the substrate by Mayer-rod coating. An enlarged cross-section of a dried catalyst layer 70 decal is illustrated on the substrate 70 in FIG. 6 with continuing reference to FIG. 5.

Figure 6:
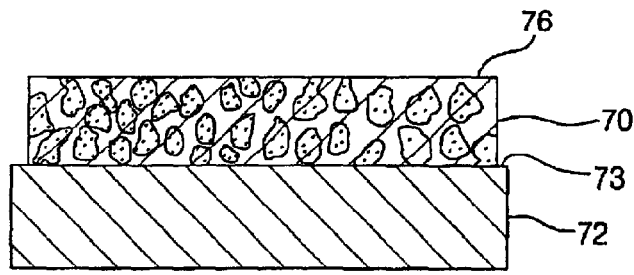
FIG. 6 is a pictorial illustration showing the electrode layer upon the metallic foil substrate during a step of the process of FIG. 5.

The catalyst layer 70 is dried as indicated at 104. The layer 70 dries by evaporation of solvent out of the catalyst layer 70. Depending on the solvents in the slurry, the applied slurry is dried and solvent removed therefrom at temperatures ranging from room temperature to 100° C. infrared lamps may be used to facilitate drying. Drying may also be performed with the aid of a vacuum. Drying is alternatively undertaken in two steps. Immediately upon coating, the decals are dried at 25° C. for some period of time. Typically, this initial drying time is from about 10 minutes to about 20 minutes. Subsequently, the decal may then be dried under infrared lamps until all the solvents have been eliminated. Drying at room temperature or under infrared lamps is sufficient to eliminate all the solvents in the catalyst layer. After the drying step, the decals are weighed to determine the solids content. A homogeneous catalyst layer as seen in FIG. 6, is produced on the substrate after the drying step.

As indicated at 106 of FIG. 5, the catalyst layers are then bonded to the polymer electrolyte membrane, e.g., by hot-pressing at or above the glass transition temperature for the ionomer under elevated pressures. At this temperature, the ionomer (e.g., Nafion) begins to flow, and due to the pressure, disperses well into the porous structure formed. By processing above the glass transition temperature, a good bond is formed between the electrode and the membrane.

Figure 7:
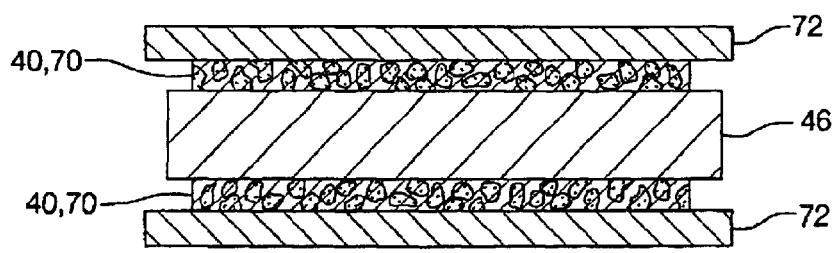
FIG. 7 is a pictorial illustration of the membrane electrode assembly showing the anode, the membrane, the cathode, and the substrate sheets during a step of the process of FIG. 5.

Referring to FIG. 7, the process preferably places a metallic substrate 72 with a dried catalyst 70 anode layer on one side of the SPE membrane 46 and a metallic substrate 72 with a dried catalyst 70 cathode layer 44 on the opposite side of the SPE membrane 46. Thus, the hot-pressing preferably simultaneously applies both dried catalyst layers 42, 44 to the SPE membrane 46. This is typically called a decal because the transfer process involves applying the dried catalyst layer 70, i.e. the electrode film 40, to a membrane 46. Alternatively, each decal 70 may be bonded to the membrane 46 sequentially.

Returning to FIG. 5, the substrate 72 is then peeled from the dried catalyst layer 40, 70 as indicated at 108, leaving the formed membrane electrode assembly 12 such as illustrated in FIG. 2. The substrate 72 is able to be removed any time after hot-pressing. The substrate 72 may simply be pulled off after permitting the substrate 72 to cool slightly. The substrate 72 preferably has a relatively low adhesion to the electrode 40, 70. The low adhesiveness is to ensure after bonding of the electrode 40, 70 to the membrane 46 that the substrate 72 will peel away from the electrode 40, 70. The formed membrane electrode assembly 12 is then taken off where it can be rolled up for subsequent use or immediately further processed into a fuel cell stack. The substrate 72 is then preferably cleaned using a solvent as indicated at 110 and as discussed above. The substrate 72 is then provided for reuse as indicated at 112 and the catalyst slurry is again coated onto the substrate at 102. This process may be repeated many times over.

Figure 8:
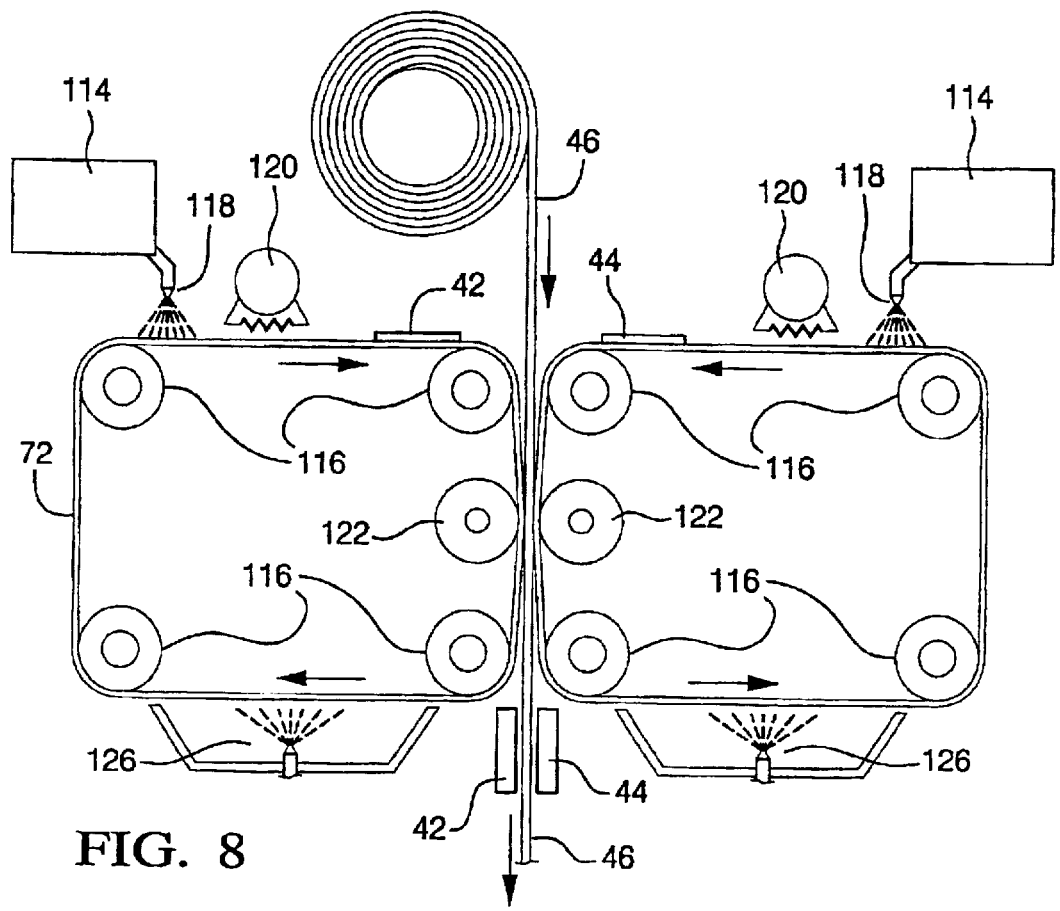
FIG. 8 is a pictorial illustration of a process and apparatus for assembling a membrane electrode assembly according to a preferred continuous method of the present invention.

Referring to FIG. 8, a preferred process embodiment is illustrated beginning with the slurry preparation station indicated at 114. The process utilizes two substrates 72, each provided as a continuous loop running around various rollers 116 in the direction indicated by the arrows. At the coating stations 118 a layer or layers of ink 70 is coated on the substrate 72. Preferably, the catalyst slurry or ink is pattern coated onto the substrate. For example, the slurry may be spread using printing processes or spray coating processes as indicted above. At the drying stations 120, the ink 70 is dried and the dried ink 70 forms the anode electrode 42 and the cathode electrode 44. The drying station 120 preferably includes infrared drying lamps. In an alternative embodiment, the drying stations are simply an extended stretch of space which is sufficient to allow the ink to dry as it passes along the extended stretch at room temperature.

A roll of SPE membrane 46 is provided centrally between the supports 72 with dried ink forming the electrodes 42, 44. The hot-pressing station 122 uses a pair of heated rollers to hot-press the electrodes 42, 44 (which are located on the substrates 72 and arranged as seen in FIG. 7) onto both sides of the SPE membrane 46. Alternatively, heated plates may be used in place of the rollers. The support 72 with the electrode 40, 70 is hot-pressed to a membrane 46 where the electrode 40, 70 is between the support 72 and the membrane 46. Following hot-pressing, the support 72 is peeled off of the membrane 46 at the peeling station 124 created by turning the substrates around the rollers 116 leaving behind a dried electrode film 70 on both sides of the membrane 46.

Alternatively, a support member (not seen) is provided on which the SPE membrane 46 is moved. The support member is preferably made of the same material as the substrate 72. The electrode decals 40, 70 are spaced apart on the substrate 72 so that during a first hot pressing operation one side of the SPE membrane 46 has a decal bonded to it and the opposite side of the SPE membrane 46 has the support member and blank substrate 72 pressing against it. Then the SPE membrane 46 is transferred off of its support member to the substrate 72 as a result of being bonded to the decal. A second electrode decal 40, 70 from the other substrate 72 is then located against the opposite side of the SPE membrane 46 and bonded thereto by a second hot-pressing operation. Then the substrates 72 are peeled from the resulting membrane electrode assembly formed by this process, prior to being cleaned and returned to the coating station 118 for reuse.

Returning to the embodiment of FIG. 8, the substrate 72 then passes through a cleaning station 126 where the substrate is, e.g., sprayed with a solvent and then wiped clean to remove the solvent. Next, the substrate 72 returns to the pattern coating station 118 by passing around the rollers 116. Thus, the process as described above is repeated over again utilizing the same substrate 72.

The membrane electrode assembly before peeling off the non-porous substrate layers 72 appears as in FIG. 7. The assembly comprises the electrolyte membrane 46 with an electrode 40, 70 on each side, and a support material 72 on each electrode 40, 70. The membrane electrode assembly with porous support layers is hot-pressed, forming a strong bond between the electrodes 40, 70 and the membrane 46. The substrate material 72 is removed before usage of the membrane electrode assembly in a fuel cell. The procedure is applicable to anode and cathode fabrication in the making of an membrane electrode assembly.

As described above, the illustrated apparatus is capable of operation, for example, as a continuous or stepped process. A stepped process where the substrate loop is started and stopped is preferred. Even more preferred is a continuous process where the substrate loop continuously moves. For example, heated nip rollers as illustrated or alternative moving plates could be used to enable continuous movement of the substrate loops even during hot pressing operations.

Many other modifications to the above described embodiments may be made. For example, a single substrate loop may be used with each side of the SPE membrane hot-pressed against different decals of the same substrate. Thus, the first decal could be peeled off before the second decal is hot-pressed onto the opposite side of the SPE membrane.

Example: Below is an example of a membrane electrode assembly prepared in accordance with the process described herein. A catalyst ink is prepared from a catalyst which preferably includes from about 20% to about 80% by weight Pt or Pt alloy supported on carbon which comprises the remaining weight percent. Specifically, a 50% Pt and 50% C catalyst is used in this example. In this case, 1 gram of 50 wt. % Pt supported on XC-72 Vulcan carbon (E-Tek, Inc., Natick, Mass.) is used.

This catalyst is mixed with 8 grams of 5 wt. % Nafion solution (SE-5112) which may be purchased from DuPont as the ionomer in this example. Flemion which may be purchased form Asahi Glass, among others, may also be utilized as the ionomer. The solvent in the solution is 60 wt. % water and 35 wt. % alcohols. In addition, water and alcohol is added to the mixture to raise the total amount of water and alcohols in the mixture to about 30 wt. % and about 59 wt. % of the mixture. This mixture, or slurry, is ball-milled for 24 hours before use. The result is the catalyst ink.

The ink is coated on a decal substrate which is a 3 mil thick sheet of aluminum foil by a Mayer rod coating process. An appropriate Mayer rod size is used to obtain the desired thickness and subsequent catalyst loading. In this example, a Mayer rod number 80 is used, the dried catalyst layer is about 14 microns thick and the resulting catalyst loading is about 0.4 mg of Pt/cm$^2$.

After coating, the decal is allowed to dry at room temperature until most of the solvent has evaporated. In this example, this initial drying time is about 15 minutes. The substrate can, however, continue to dry at room temperature for an additional 30 minutes or more. Alternatively, (as in this example) the decal is further dried under an infrared (IR) lamp from about 5 minutes to about 10 minutes to evaporate any residual solvent.

After drying, an additional layer of dilute ionomer (diluted to a 1 wt. % Nafion in methanol) solution is optionally sprayed on top of the dried catalyst layer as in this example. The data indicates that none of the ionomer is absorbed into the foil substrate, and therefore, all the ionomer in the ink gets transferred onto the membrane. Spraying this additional ionomer solution can improve contact between the catalyst layer and the polymer electrolyte membrane which translates into a reduction in the contact resistance. After spraying the dilute ionomer solution, the substrate is again dried under an IR lamp for about 5 minutes to drive off any residual solvent.

A decal fully formed and dried as described above is placed on each side of a polymer electrolyte membrane. The catalyst decal is arranged against the polymer electrolyte membrane and the foil substrates are outwardly exposed. In this example, the configuration is hot pressed at 400 psi, 145° C. for from about 4 minutes to about 8 minutes depending on size of membrane electrode assembly. For a 50 cm$^2$ membrane electrode assembly of this example, including decals of roughly equivalent size, the hot pressing operation is for about 4 to about 5 minutes.

The membrane electrode assembly is then allowed to cool down for about one minute at room temperature prior to peeling the aluminum foil substrate from each side of the membrane electrode assembly. After removing the substrate, the catalyst decal remains on each side of the membrane. Thus, a final membrane electrode assembly (MEA) is formed. This assembly is also referred to as a catalyst coated membrane (CCM). The substrate is then available for re-use in having other decals formed thereon.

Figure 9:
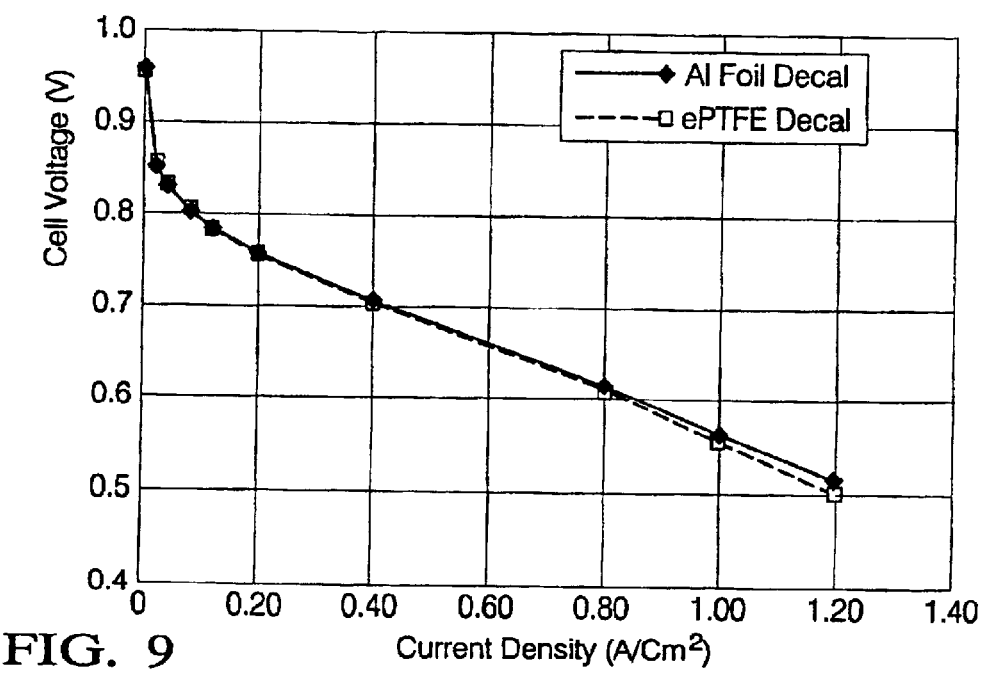
FIG. 9 shows the cell potential as a function of the current density for certain membrane electrode assemblies formed by the process of FIG. 5, as compared to membrane electrode assemblies formed using ePTFE as decal substrates.

Referring to FIG. 9, a polarization curve is provided which illustrates the relationship between cell voltage and current density. The curve is plotted for membrane electrode assemblies made by the process described herein using a 3 mil thick aluminum foil as the decal substrate. The curve is also plotted for a membrane electrode assembly made by a process which uses expanded PTFE as the substrate. As can be seen, the polarization curves using either method are virtually identical. With the method of the present invention, however, cost advantages are achieved in using decals made on reusable substrates as previously discussed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method useful for making a membrane electrode assembly comprising:
providing a non-porous substrate comprising a metallic film that is laminated to another film material which provides additional structural integrity, which substrate has sufficient structural integrity to be reusable;
forming a slurry including an ionically conductive material, an electrically conductive material, a catalyst, and a solvent;

applying the slurry onto the non-porous substrate;

drying the applied slurry to form a first decal;

bonding the first decal to a membrane;

peeling the non-porous substrate from the first decal in a substantially undamaged condition; and reusing the non-porous substrate by applying the slurry onto the nonporous substrate, drying the applied slurry to form a second decal; bonding the second decal to a membrane and peeling the non-porous substrate from the second decal.

2. A method according to claim 1 further comprising the step of cleaning the non-porous substrate prior to the step of reusing.

3. A method according to claim 2 wherein the cleaning step further comprise applying to the non-porous substrate a solvent selected from the group consisting of iso and normal propanol, ethanol, methanol, water, and mixtures thereof.

4. A method according to claim 1 wherein the drying steps include subjecting the slurry to infrared lamps.

5. A method according to claim 1 wherein the applying steps include a coating process selected from the group consisting of a printing and a spraying processes.

6. A method according to claim 1 wherein the ionically conductive material comprises an ionomer and the bonding steps further comprise hot-pressing at or above the glass transition temperature of the ionomer.

7. A method according to claim 1 wherein the electrically conductive material is carbon and the catalyst is a metal.

8. A method according to claim 1 wherein the ionically conductive material is a perfluorosulfonate ionomer.

9. A method of making membrane electrode assemblies comprising:

providing a loop of a non-porous substrate comprising a metallic film that is laminated to another film material which provides additional structural integrity;

forming a slurry comprising an ionically conductive material, an electrically conductive material, a catalyst, and a solvent;

applying the slurry to the non-porous substrate in a pattern of discrete areas;

drying the slurry to form a first plurality of decals corresponding to the discrete areas on the non-porous substrate;

bonding the decals to opposite sides of a first plurality of membranes to form a first plurality of membrane electrode assemblies, peeling the first plurality of membrane electrode assemblies from the loop of non-porous substrate;

cleaning the non-porous substrate;

re-applying the slurry to the cleaned loop of non-porous substrate;

drying the re-applied slurry to form a second plurality of decals;

bonding the second plurality of decals to a second plurality of membranes to form a second plurality of membrane electrode assemblies; and peeling the second plurality of membrane electrode assemblies from the loop of non-porous substrate.

10. A method according to claim 9 wherein the cleaning step further comprises applying to the non-porous substrate a solvent selected from the group consisting of iso and normal propanol, ethanol, methanol, water, and mixtures thereof.

11. A method according to claim 9 wherein bonding the decals to opposite sides occurs simultaneously.

12. A method according to claim 9 wherein the loop of non-porous substrate has sufficient structural integrity to be reused.

13. A method according to claim 9 further comprising continuously moving the loop of non-porous substrate.

14. A method according to claim 9 wherein the applying steps comprise a coating process selected from the group consisting of printing and spraying processes.

15. A method according to claim 9 wherein the ionically conductive material comprises an ionomer and the bonding steps further comprise hot-pressing at or above the glass transition temperature of the ionomer.

16. A method according to claim 9 wherein the electrically conductive material is carbon and the catalyst is a metal.

17. A method according to claim 9 wherein the ionically conductive material is a perfluorosulfonate ionomer.

18. A method useful for making a membrane electrode assembly comprising:

providing a non-porous substrate which has sufficient structural integrity to be reusable;

forming a slurry including an ionically conductive material, an electrically conductive material, a catalyst, and a solvent;

applying the slurry onto the non-porous substrate;

drying the applied slurry to form a decal;

bonding the decal to a membrane; and peeling the substrate from the decal in a substantially undamaged condition so that it may be reused;

wherein the non-porous substrate comprises a metallic film and the metallic film is provided by laminating the metallic film to another film material which provides at least some of the structural integrity of the nonporous substrate.

* * * * *